(12) United States Patent
Zhang et al.

(10) Patent No.: US 8,966,171 B2
(45) Date of Patent: Feb. 24, 2015

(54) ACCESS OPTIMIZATION METHOD FOR MAIN MEMORY DATABASE BASED ON PAGE-COLORING

(75) Inventors: Yan-Song Zhang, Beijing (CN); Shan Wang, Beijing (CN); Xuan Zhou, Beijing (CN); Min Jiao, Beijing (CN); Zhan-Wei Wang, Beijing (CN)

(73) Assignee: Renmin University of China, Beijing (CN)

( * ) Notice: Subject to any disclaimer, the term of this patent is extended or adjusted under 35 U.S.C. 154(b) by 317 days.

(21) Appl. No.: 13/514,291

(22) PCT Filed: May 16, 2012

(86) PCT No.: PCT/CN2012/075619
§ 371 (c)(1),
(2), (4) Date: Jun. 6, 2012

(87) PCT Pub. No.: WO2013/155750
PCT Pub. Date: Oct. 24, 2013

(65) Prior Publication Data
US 2013/0275649 A1    Oct. 17, 2013

(51) Int. Cl.
*G06F 12/10*    (2006.01)

(52) U.S. Cl.
USPC .......................................................... 711/113

(58) Field of Classification Search
CPC ....... G06F 12/02; G06F 12/08; G06F 12/084; G06F 12/122; G06F 12/1045
See application file for complete search history.

(56) References Cited

U.S. PATENT DOCUMENTS

| | | | |
|---|---|---|---|
| 7,620,766 B1 * | 11/2009 | Waldspurger | 711/6 |
| 7,747,820 B2 * | 6/2010 | Beckmann et al. | 711/118 |
| 2008/0055617 A1 * | 3/2008 | Savagaonkar | 358/1.9 |

OTHER PUBLICATIONS

Yansong Zhang; Min Jiao; Zhanwei Wang; Shan Wang; Xuan Zhou, "W-Order Scan: Minimizing Cache Pollution by Application Software Level Cache Management for MMDB", Web-Age Information Management, Sep. 2011, pp. 480-492, Spinger Science+Business Media, Wuhan, China.

* cited by examiner

*Primary Examiner* — Hiep Nguyen
(74) *Attorney, Agent, or Firm* — Cheng-Ju Chiang

(57) ABSTRACT

An access optimization method for a main memory database based on page-coloring is described. An access sequence of all data pages of a weak locality dataset is ordered by page-color, and all the data pages are grouped by page-color, and then all the data pages of the weak locality dataset are scanned in a sequence of page-color grouping. Further, a number of memory pages having the same page-color are preset as a page-color queue, in which the page-color queue serves as a memory cache before a memory page is loaded into a CPU cache; the data page of the weak locality dataset first enters the page-color queue in an asynchronous mode, and is then loaded into the CPU cache to complete data processing. Accordingly, cache conflicts between datasets with different data locality strengths can be effectively reduced.

17 Claims, 5 Drawing Sheets

ACCESS OPTIMIZATION METHOD FOR MAIN MEMORY DATABASE BASED ON PAGE-COLORING

CROSS REFERENCE TO RELATED APPLICATIONS

The present application is a 35 U.S.C. §371 National Phase conversion of International (PCT) Patent Application No. PCT/CN2012/075619, filed on May 16, 2012, the disclosure of which is incorporated by reference herein. The PCT International Patent Application was filed in Chinese. This application claims the priority of China Patent Application No. 201210113917.3, filed on Apr. 16, 2012. This invention is partly disclosed in a published article, Yansong Zhang, Min Jiao, Zhanwei Wang, Shan Wang, Xuan Zhou, "W-Order Scan: Minimizing Cache Pollution by Application Software Level Cache Management for MMDB", WAIM'11 Proceedings of the 12th international conference on Web-age information management, Sep. 14-16, 2011, Wuhan, China.

FIELD OF THE INVENTION

The present invention relates to an access optimization method for a main memory database, and more particularly to a method for performing access control on datasets with different data locality strengths based on page-coloring so as to optimize a central processing unit (CPU) cache used by a main memory database, which belongs to the technical field of database management.

BACKGROUND OF THE INVENTION

A main memory database is a database with all data resident in a main memory unlike a conventional database with all data stored in an external storage. A remarkable feature of the main memory database is that all data access control is performed in the main memory, resulting in data read/write speed several orders of magnitude higher than those of a disk resident database, thereby greatly improving the performance of database applications. Compared with the disk resident database, the main memory database has redesigned system architecture, and also has corresponding improvement in terms of data cache, query optimization, and parallel operation.

In another aspect, the existing microprocessor (CPU) has entered the multi-core era. The multi-core microprocessor usually adopts system architecture of a shared CPU cache, in which a hardware-level LRU (least recently used)-like replacement algorithm is employed for the CPU cache. When query processing involves a small strong locality (frequently accessed) dataset and a large weak locality (single-usage access or re-accessed within a long period) dataset, sequential access on the weak locality dataset produces cache conflicts with the strong locality dataset, so that the strong locality dataset is evicted from the CPU cache and can only be reloaded into the CPU cache in the subsequent operation. As a result, a large number of cache miss conflicts are generated due to cache bump, thereby increasing the latency of data access. This phenomenon is called cache pollution. In practice, the macroscopic cache pollution refers to cache conflicting between different query processing processes or threads in a shared CPU cache, for example, cache conflicting between a hash join query processing thread and an index join query processing thread in the shared CPU cache. The microscopic cache pollution refers to cache conflicting between datasets with different access characteristics in a query processing process, for example, cache conflicting between a sequentially scanned external table and a hash table in a hash join.

Page-coloring is a technology for high-speed address translation between a main memory and a CPU cache, namely, controlling call of a memory page into a specified region of the CPU cache by low address bit mapping of a physical memory address. In the existing page-coloring, data is loaded into a specified non-conflicting cache region by changing memory page-colors with different localities, so as to isolate cache pollution of weak locality data on strong locality data. Currently, a mature cache access optimization method is extending operating system kernel modules to support management of memory resources based on page-color queues, and providing concurrent query processing processes the function of allocating main memories by page-color, so as to control memory address space of different processes with not overlaps in the CPU cache, thereby reducing cache conflicts between processes having different data access characteristics. Such technical is applicable for the buffer management function of a disk resident database. Data of the disk resident database reside in a disk, so the data must be loaded into a memory buffer before query processing. Moreover, weak locality data is not reusable or is reused within a long period. Therefore, weak locality datasets with a large data volume can be exchanged to be placed in a buffer memory corresponding to a small number of memory page-color queues through the memory address allocation technology of the memory buffer, so as to allocate more memory page-color queues for strong locality datasets to ensure sufficient available memory resources. However, the page-color optimization technology of the disk resident database is process granularity oriented and cannot provide optimization with fine granularity for datasets with different data access characteristics in a process.

The page-coloring faces two technical challenges in the application of the main memory database. One challenge is that data of the main memory database resides in the main memory, and the main memory database accesses the main memory directly unlike the disk resident database that accesses data indirectly through the buffer. A large weak locality dataset often occupies large memory address space, while its weak locality requires mapping of large memory address space to smallest cache address space, that is to say, requires allocation of fewest page-colors for the huge memory address space. Each page-color represents a maximum of 1/n (n is the number of page-colors) available memory address space. The main memory database cannot allocate few page-colors for the large datasets with weak locality. The second challenge is that, if dynamic page-coloring is employed to change page-colors of weak locality data pages by memcpy function before memory data access, although the problem that few page-colors cannot be allocated for weak locality datasets can be solved, the latency of memcpy function seriously affects the overall performance of data access.

Therefore, the challenge of cache optimization technology for the main memory database is that no buffer mechanism exists in the main memory to support a reallocation mechanism of dynamically changing page-colors of weak locality datasets with large address space through cache access. If physical memory address space is assigned for strong locality datasets and weak locality datasets by page-color, the utilization rate of the memory address space is low. Allocation of many page-colors means acquisition of large address space. However, a strong locality dataset just requires a large page-color region and does not require actually large memory address space to store the small dataset. Meanwhile, a weak locality dataset just requires a small page-color region and actually requires large memory address space to store the large dataset. The quotas of the memory address space and the page-color region are difficult to be satisfied at the same time.

SUMMARY OF THE INVENTION

The objective of the present invention is to provide an access optimization method for a main memory database based on page-coloring, in which access control is performed on datasets with different data locality strengths based on page-coloring, so as to reduce conflicts between the datasets with different access characteristics in a CPU cache, decrease the cache miss rate, and improve the overall performance of the main memory database.

According to the above objective, the present invention adopts the following technical solution.

An access optimization method for a main memory database based on page-coloring is provided, which is characterized as follows.

During cache access of the main memory database, an access sequence of all data pages of a weak locality dataset is ordered by page-color, and all the data pages are grouped by page-color, and then all the data pages of the weak locality dataset are scanned in a sequence of page-color grouping.

Preferably, a number of memory pages with the same page-color are preset as a page-color queue, in which the page-color queue serves as a memory cache before a memory page is loaded into a CPU cache; the data page of the weak locality dataset first enters the page-color queue in an asynchronous mode, and is then loaded into the CPU cache to complete data processing.

Preferably, the sequence of page-color grouping is a W-order sequence following on page-color.

Preferably, during scan with W-order sequence, a large memory block with consecutive physical addresses is applied for, in a unit of a multiple of a cache size/set associative number, to an operating system to store the weak locality dataset.

Preferably, when a virtual memory allocated for the weak locality dataset is not consecutive in physical address, first, page-color indexes are created for virtual address space, an entry address and a page-color of each page are recorded in an index of a binary data structure, and then the indexes are ordered by page-color, page entry addresses with the same page-color are gathered in groups, and scan is performed in a sequence of page addresses of the indexes during scan in the W-order sequence.

Preferably, the page-color queue is in the form of a cyclic queue, and a queue page, once accessed, becomes an outdated page and is covered by a subsequent page to be accessed.

Preferably, in the page-color queue, a cache loading operation of an $i^{th}$ block is pipeline parallel with page copy of an $(i-1)^{th}$ block, where i is a natural number.

Preferably, the data page is copied to the page-color queue in a DMA memcpy mode.

Preferably, a length of the page-color queue depends on a latency of loading the data page into the CPU cache and a latency of the DMA memcpy mode.

The present invention has the following beneficial effects.

(1) The problem that cache address space cannot be allocated, depending on page-color control by OS, for processes or threads in an optimized way in main memory database applications can be solved.

(2) Cache conflicts between datasets with different data locality strengths are effectively reduced.

(3) In W-order scan, only a sequential scan algorithm is changed, and it is not necessary to redesign a query processing algorithm for cache optimization or to extend operating system kernel functions.

BRIEF DESCRIPTION OF THE DRAWINGS

The present disclosure will become more fully understood from the detailed description given herein below for illustration only, and thus are not limitative of the present disclosure, and wherein.

DETAILED DESCRIPTION OF THE PREFERRED EMBODIMENTS

In the present invention, a cache mainly refers to a processor hardware-level CPU cache. Unlike a database software-level buffer, access control of the cache depends on hardware instructions, and database software cannot perform active management like on the buffer. The lowest-level target of cache access is optimizing access modes of datasets with different access characteristics, so the process-level cache optimization technology still has large space for further optimization. Accordingly, the present invention provides a cache access optimization method applied in a main memory database. The method uses a mainstream cache replacement algorithm, namely, n-way set associative algorithm, of a shared CPU cache of a current multi-core processor as the background, a data page access sequence is optimized according to page-colors of memory data, so as to reduce cache conflicting in on-line analytical processing (OLAP) query processing and improve the overall performance of the main memory database.

Figure 1:
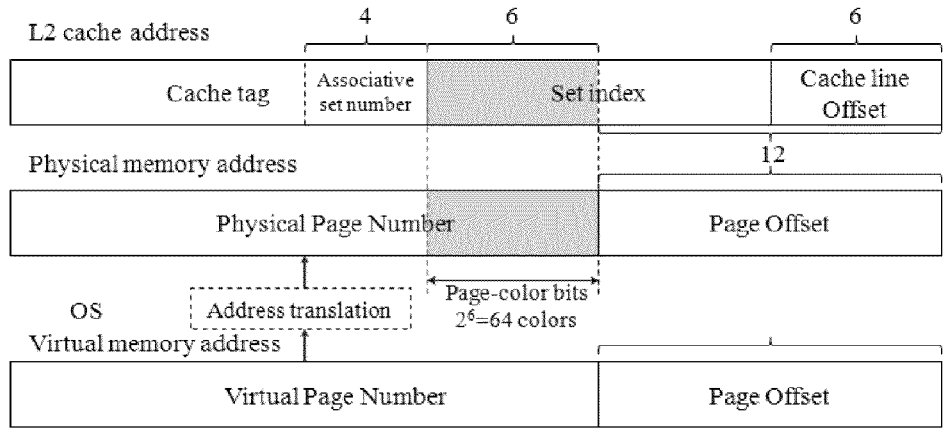
FIG. 1 is a schematic view of an address allocation mechanism between a main memory and a cache.
Figure 2:
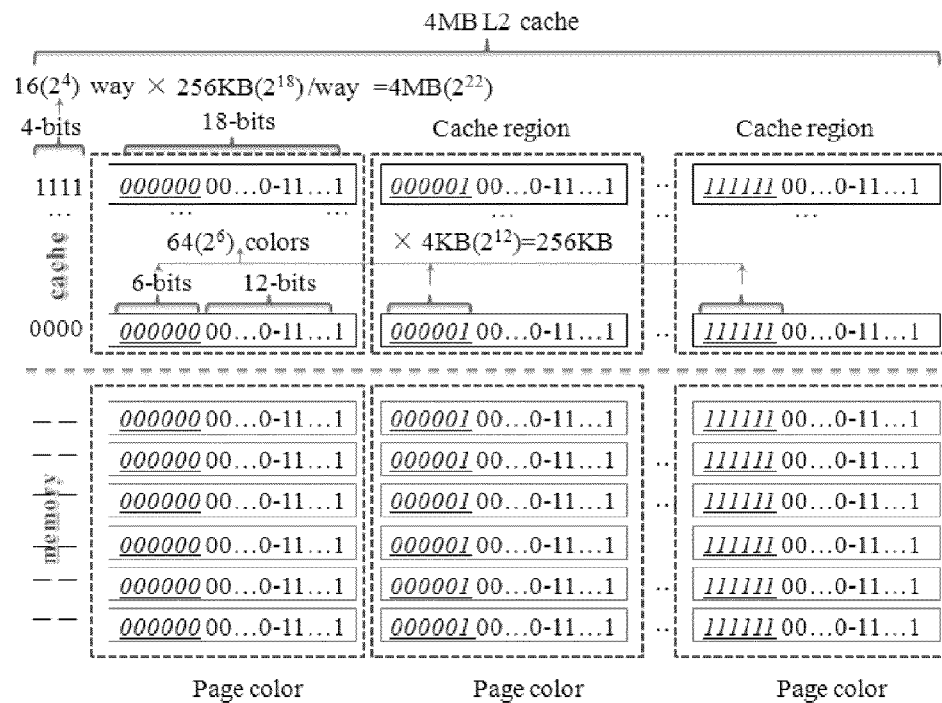
FIG. 2 is a schematic view of an address matrix formed by memory and cache addresses.

Page-coloring is a high-speed address mapping technology adopted in modern microprocessors, and is used for mapping a physical memory address to a CPU cache address (for further reference, please see paper "Towards Practical Page-coloring-based p Multi-core Cache Management" of Xiao Zhang, Sandhya Dwarkadas, and Kai Shen, published in European Conference on Computer Systems '09). The shared cache of the microprocessor usually adopts the n-way set associative algorithm. Taking 16-way set associativity of a 4MB shared cache as an example, the main memory and the cache employ a unified address allocation mechanism, as shown in FIG. 1, lower 12 bits ($2^{12}$bit=4KB) of a 22-bit cache address ($2^{22}$bit=4MB) are used as a page address, higher 6 bits ($2^6$=64) are used as a page-color flag bit (number of page-colors=cache size (4MB)/page size (4KB)/cache associativity (16)=64), and highest 4 bits ($2^4$=16) are used as an associative set number. Through unified addressing, memory and cache addresses can be represented as an address matrix shown in FIG. 2. A data page in the main memory is loaded into a set associative cache region with the same page-color in the cache during access, that is, for a memory page, the data page is loaded, based on page-color, into the cache region with the same page-color in the cache, and then data is loaded into a certain page in the cache region through an LRU (least recently used)-like replacement algorithm.

Usually, sequential scan of data is performed in a natural ascending order of page addresses. For example, from the perspective of page-color, a page with a page-color of 0, a page with a page-color of 1 till a page with a page-color of 63 are scanned in turn, and then a page with a page-color of 0 is scanned, and so on, which assumes a Z-order sequence from the page-color address matrix. Such Z-order sequence is disadvantageous to implementation of the data-level cache optimization technology.

Figure 3:
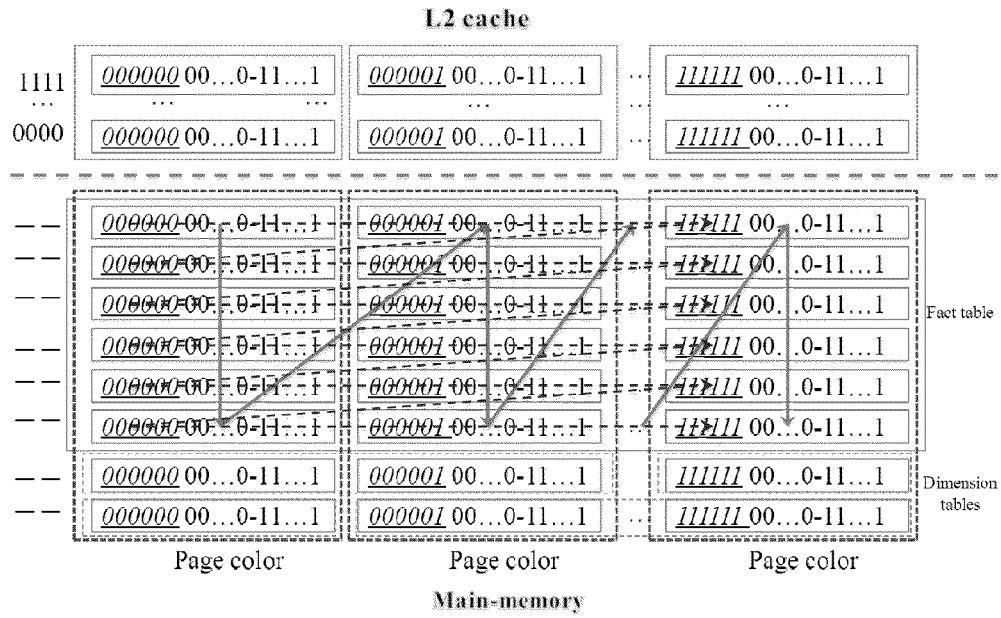
FIG. 3 is a schematic view illustrating working principles of W-order scan.

Accordingly, the present inventor proposes a page scan method called W-order sequence. W-order sequence means that data scan is performed in a sequence of page-colors. When index scan selectivity is high, page-color flag bits are extracted from an index access record address, and records in the index range are accessed multiple times in the sequence of page-colors. That is, first, all pages with a page-color of i (i is a natural number) are scanned, then, all pages with a page-color of i+1 are scanned, until all pages corresponding to the last page-color (that is, the page-color record group) are scanned, which assumes a W shape in the memory address scan sequence, and therefore, such scan in the sequence of page-colors is called a W-order scan (for further reference, please see the paper "W-Order scan: minimizing cache pollution by application software level cache management for MMDB" of Yansong Zhang et al., published in WAIM'11 Proceedings of the 12th international conference on Web-age information management). FIG. 3 is a schematic view of W-order scan. The W-order scan is scan of pages in a sequence of page-colors. First, all pages with a page-color number of 0 in a memory dataset are scanned, then, all pages with a page-color number of 1 of the next group are scanned, until the last group. The W-order scan operation supports disordered access, and is especially applicable to set operation based relational databases.

On the basis of the above technical means, the cache access optimization method provided in the present invention mainly includes technical contents in two aspects: (1) static page access sequence optimization; and (2) dynamic page-color queue optimization. The static page access sequence optimization means that during data page access, physical addresses of pages are not changed, and only an access sequence of the pages is optimized. The dynamic page color access queue optimization means that a page-color buffer is preset, and during page access, the page enters the page-color buffer first to change a page-color, so as to reduce address conflicts when loading pages into the cache. The static page optimization is suitable for a data access sequence free scan operation on a weak locality dataset, in which data access characteristics need to be known in advance, while the dynamic page queue is suitable for universal data access optimization, in which data access characteristics do not need to be known in advance. Detailed description is provided below.

The so-called static page access sequence optimization means that a data page access sequence of a weak locality dataset is optimized in a sequence of page-colors, that is, an access sequence of all data pages of a weak locality dataset with low access frequency is ordered by page-color, and all the data pages are grouped by page-color, and then all the data pages of the weak locality dataset are scanned in a sequence of page-color grouping. In this way, the access sequence of pages of the weak locality dataset is no longer a Z-order sequence naturally increasing with memory address, but is a W-order sequence increasing based on page-color.

To satisfy the requirements of static page access sequence optimization, a consecutive physical memory space allocation technology is adopted in the present invention first. Specifically, a function such as kmalloc ( ) is used to apply to an operating system for a large storage space with consecutive physical addresses to store a weak locality dataset. The application for the storage space with consecutive physical addresses complies with an integral multiple of 4KB×number of page-colors (for example, for a system with 64 page-colors, a memory block that is an integral multiple of 4KB× 64=256KB, e.g., 1MB, is allocated). Within a data block with consecutive physical addresses, pages of a designated page-color may be calculated according to an offset address and then accessed, so as to support multi-pass scan in the sequence of page-colors in the data block with consecutive physical addresses.

In another aspect, a virtual memory space allocation technology default in a Linux operating system is also adopted in the present invention. Specifically, when a malloc ( ) function is used to allocate a memory block, a memory block allocated for virtual addresses may not have consecutive physical addresses, and page-colors of pages cannot be calculated based on virtual addresses. In this case, page-color indexes are created for the virtual address space, an entry address and a page-color of each page are recorded in an index of a binary data structure, and then the indexes are ordered by page-color, page entry addresses with the same page-color are gathered in groups, and scan is performed in a sequence of page addresses of the page-color index during table scan.

In the cache access optimization method for the main memory database provided in the present invention, the sequential (i.e., the Z-order sequential) table scan operation is replaced with the W-order sequential scan operation in the query processing, so as to limit cache conflicts between a fact table and a hash table in a hash join to cache address space of one page-color during scan of each group by page-color, thereby reducing overall cache conflicts.

Figure 4:
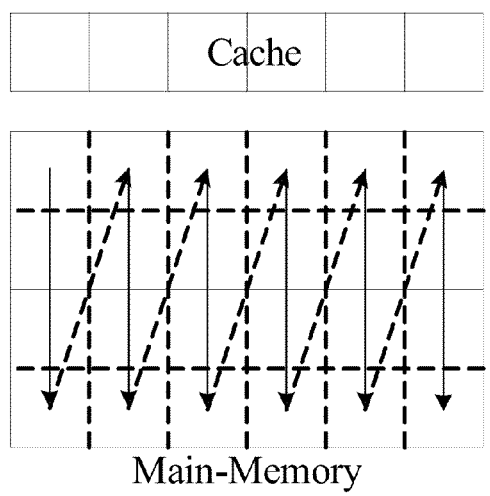
FIG. 4 is a schematic view of W-order scan in a memory block with consecutive physical addresses.

FIG. 4 shows implementation steps of W-order scan in a memory block with consecutive physical addresses based on a kmalloc ( ) function. During the W-order scan, a large memory block with consecutive physical addresses is applied for, in a unit of a multiple of a cache size/set associative number (for example, 4MB/16-way set associativity), to an operating system to store a weak locality dataset. For the page matrix organized by page-color in the memory block shown in FIG. 4, an entry address of a designated page-color queue can be obtained by dynamic address calculation, so as to implement the W-order scan in the sequence of page-colors.

Figure 5:
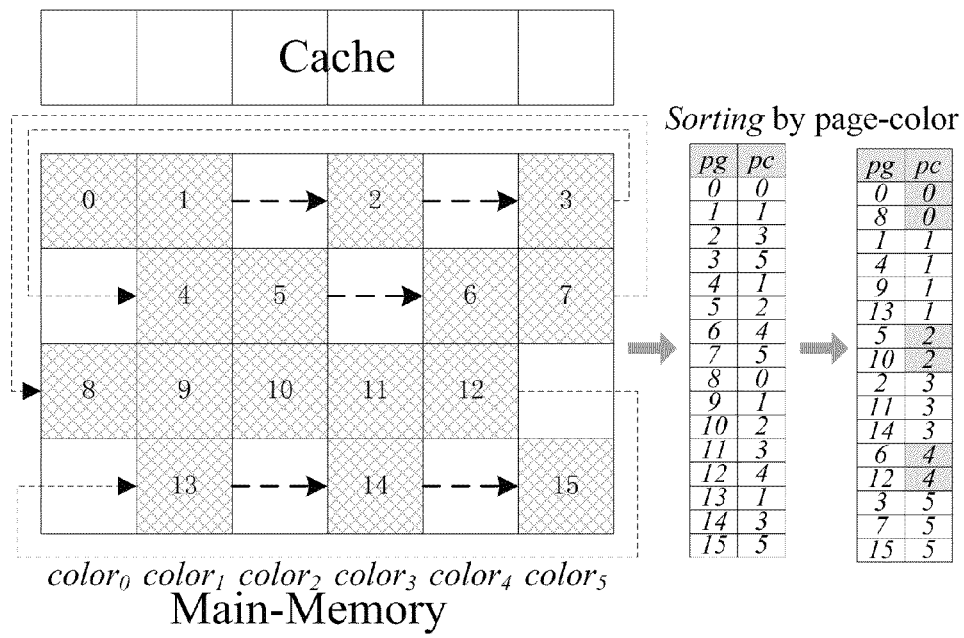
FIG. 5 is a schematic view of W-order scan on physically non-consecutive virtual addresses.

FIG. 5 shows implementation steps of W-order scan on virtual memory addresses with non-consecutive physical addresses. When the virtual memory allocated for a dataset is not consecutive in physical address, first, a page-color index is created to store an entry address (pg) and a page-color (pc) number of each memory page, then, indexes are ordered according to the page-color numbers, and the page-color indexes are naturally grouped according to the page-color numbers. When a scan operation is performed, pages of the dataset are accessed in a sequence of the page entry addresses in the page-color indexes, so as to implement the W-order scan on the virtual memory addresses with non-consecutive physical addresses. In this procedure, the page-color index stores a data pair for each page, resulting in small overhead of storage space.

For hash join algorithms, the use of optimization of the data page access sequence (i.e., W-order sequence) based on page-color can reduce the cache evicting effect of single-usage accessed data on frequently accessed datasets, thereby decreasing cache misses.

Next, the dynamic page-color queue optimization technology in the present invention is illustrated. The so-called dynamic page-color queue optimization technology means that a number of memory pages with the same page-color are preset as a page-color queue, and data pages of a weak locality dataset first enter the page-color queue in an asynchronous mode, and are then loaded into a CPU cache to complete data processing. With this technology, weak locality (single-usage access or re-accessed within a long period) data can be cached in the page-color queue before being accessed, further reducing cache conflicts.

The specific implementation steps of the dynamic page-color queue optimization technology are as follows. First, n (n is a natural number) pages with the same page-color are applied for as a page-color queue in main memory of a main memory database, in which the page-color queue serves as a memory cache before a memory page is loaded into the CPU cache. The page-color queue is in the form of a cyclic queue, that is, in the page-color queue, an $i^{th}$ queue page, once accessed, becomes an exchangeable page and is covered by a subsequent page to be accessed. During access, data pages are copied to the page-color queues in turn and then are loaded into the CPU cache, that is, the page-color queue serves as the memory cache of weak locality datasets. The data page is copied to the page-color queue in a DMA memcpy mode. In the DMA memcpy mode, a DMA channel, instead of CPU processing, is used to copy a memory block, so no additional cache pollution is produced. The length of the page-color queue depends on a latency of loading the data page into the CPU cache and a latency of the DMA memcpy mode itself. If the latency of loading into the CPU cache is small, the length of the page-color queue is increased to improve the cache efficiency.

The page-color queue employs a pipeline update mode, that is, a cache loading operation of an $i^{th}$ (i is a natural number) block is pipeline parallel with page copy of an $(i-1)^{th}$ block in the page-color queue. For example, after a block B1 is loaded into the cache, a block B2 in the page-color queue is loaded in turn, and at this time, the $(n+1)^{th}$ block can be copied to the block B1. At this time, a data access pointer is i mod n, and a data update pointer is (i−1) mod n (n represents the number of pages in the page-color queue).

Figure 6:
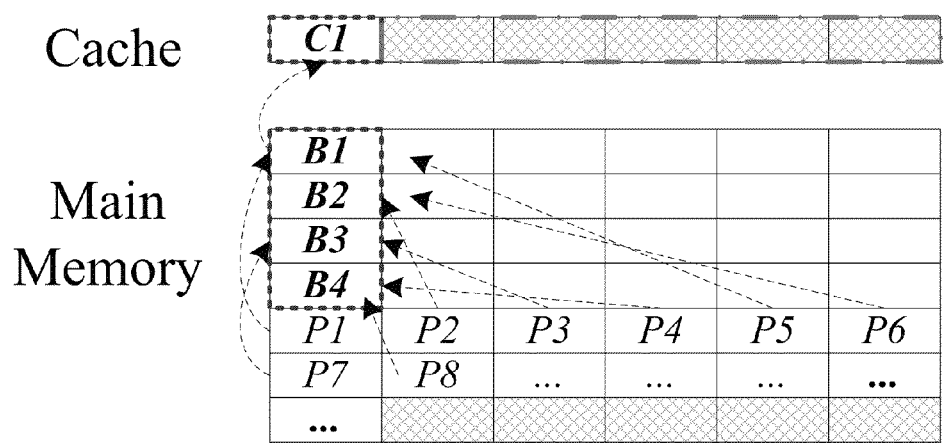
FIG. 6 is a schematic view illustrating working principles of dynamic page-color queue optimization technology.

FIG. 6 shows execution principles of the dynamic page-color queue optimization technology. B1-B4 are page-color queues, and P1, P2, . . . are dataset pages. The page-color queue is a cyclic queue, in which the $i^{th}$ page is an access pointer, the $(i-1)^{th}$ page is an update pointer, and the access of the $i^{th}$ page is performed synchronously with the update of the $(i-1)^{th}$ page. A memcpy mode supported by a DMA channel is employed in the copy operation of data pages to the page-color queues, and copy is performed directly between memory pages without using the CPU, so as to reduce CPU overhead and additional cache pollution that is caused.

Figure 7:
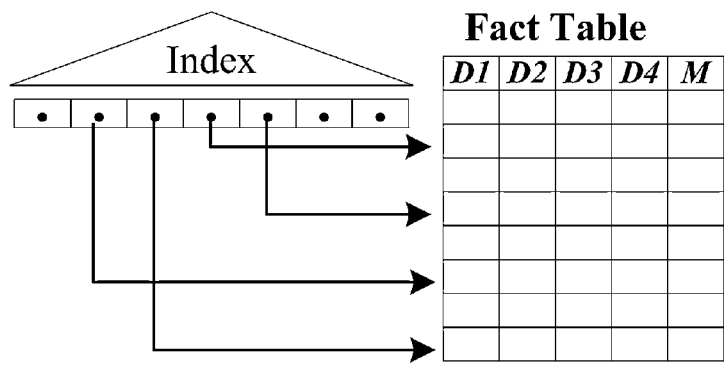
FIG. 7 is a schematic view of index scan in the prior art.

FIG. 7 is a schematic view of index scan in the prior art. The index scan is performed in a sequence of key values, memory addresses are randomly accessed, the access sequence cannot be optimized in advance, and the static page W-order scan technology cannot be used directly. An index entry of a designated value in indexes is accessed first in the index scan. When index fields have duplicated values, the index scan first changes to scan of index data entries in a designated range of the indexes, and actual access to physical records is implemented according to address information of the index entries during the scan. Record is the unit of physical addresses in the indexes, so the access sequence of the overall page is optimized by using the dynamic page-color queue optimization technology, resulting in high cost and low efficiency.

Figure 8:
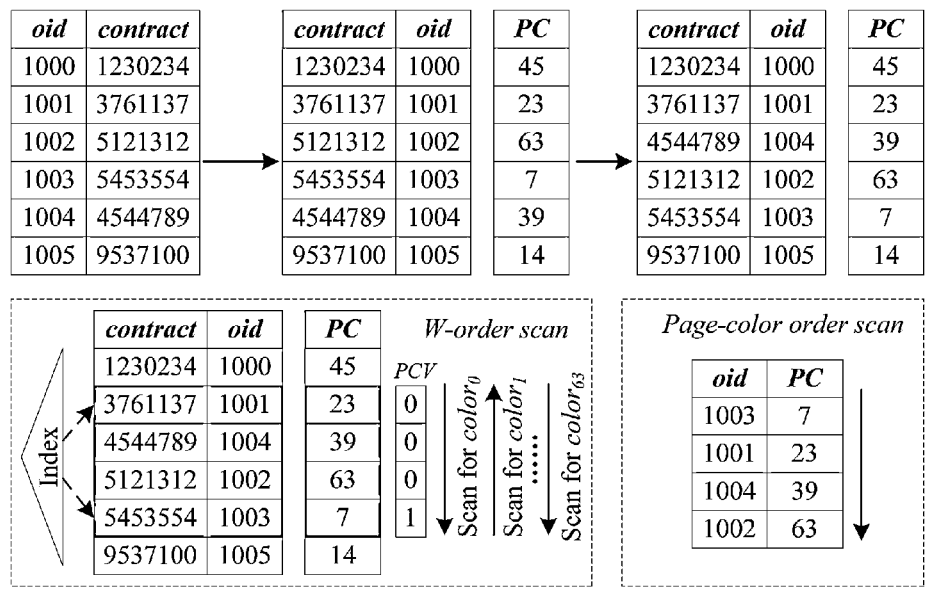
FIG. 8 is a schematic view illustrating principles of cache optimization of index scan in the present invention.

FIG. 8 shows implementation principles of cache optimization applied in index scan. In FIG. 8, oid represents a record physical address, contract represents an index key value column, and PC represents a page-color number. A page-color number is extracted from a record address through a dynamic address translation function in the index, or an auxiliary data structure for recording page-colors of addresses is generated when an index is generated (that is, a page-color data entry is added in the index to record a page-color number of a current record). When index scan is performed, if the selectivity is low, random access is performed directly without cache optimization; if the index scan selectivity is higher than a threshold, multi-pass page-color scan is performed.

For example, a corresponding page-color number of 62 is obtained by resolving a physical page start address "10FFEF" according to a page-color bit. The page-color number is extracted from the record address. During index scan, if the selectivity is low, random access is performed directly without cache optimization. In practice, statistical information of an index field is usually used, for example, when a field "Product Model" is indexed, the number of different values of different product models is counted, and during the index scan, according to a query condition, for example, "Product Model='tablet computer'", the number of records possibly satisfying the condition is estimated, so as to determine the selectivity. If the index scan selectivity is higher than a threshold, multi-pass page-color scan is performed. The threshold needs to be determined according to experimental test results and empirical values. For example, if the selectivity is determined to be higher than 30% through experimental measure, the overall performance may be optimized through multi-pass page-color scan. The specific implementation steps include processing flows shown in two dashed line boxes in the lower half of FIG. 8.

The dashed line box on the left represents that a multi-pass scan method is used for scanning records in a specific range of indexes, in which only records corresponding to a designated page-color are accessed in each scan, that is, records with a page-color of 0 are accessed for the first time, and so on. To reduce access to invalid records in multi-pass scan, positions of accessed records are recorded using a page-color vector bitmap during the multi-pass scan, and as multi-pass record access is performed, there are more and more positions of 1 in the page-color vector bitmap (the page-color vector bitmap records a scanned page-color number, for example, the $1^{st}$ bit of the bitmap changes to 1 after all pages with a page-color of 0 are scanned, the $2^{nd}$ position of the bitmap changes to 1 after all pages with a color number of 1 are scanned, and so on), the larger the proportion of records that may be skipped in subsequent scan, and the higher the efficiency of random access. A W-order scan sequence is used in multi-pass scan, that is, records with a page-color of i are scanned from top to bottom, then records with a page-color of i+1 are scanned from bottom to top, and so on. With the multi-pass W-order scan, the data reuse path between the beginning and the end of the sequence is shortened, and the utilization rate of cached data in the cache can be increased. The dashed line box on the right represents that records in a designated range of indexes are ordered by page-color and then accessed. In case of a large search range of indexes and a large number of records, ordering leads to high cost and may affect the performance gain brought about by cache optimization.

Through the above W-order scan optimization technology, optimized access to datasets with different access localities is realized with a dataset as granularity, and the fewest cache access conflicts are achieved within one database query processing thread. However, a multi-core processor usually adopts a hardware structure of a shared CPU cache. Therefore, it is necessary to further consider the problem of data access optimization between multiple parallel processing threads in one shared CPU cache so as to reduce access conflicts of the concurrent processing threads with the shared CPU cache.

Figure 9:
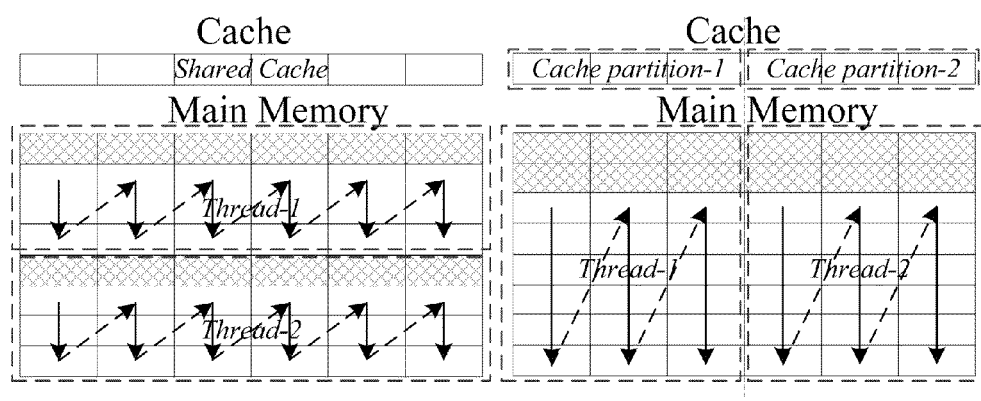
FIG. 9 is a schematic view illustrating working principles of parallel hash join query processing in a multi-core processor.

FIG. 9 shows working principles of using the present cache access optimization method to implement parallel hash join query processing in a multi-core processor. For parallel hash joins in a multi-core processor, each hash join processing thread separately executes a hash join algorithm based on W-order scan. The left half of FIG. 9 represents that two processing threads share a CPU cache and memory address space, and the right half represents that the CPU cache is divided, by a cache partitioning technology, into two partitions to serve different processing threads. In FIG. 9, light-color blocks represent sequentially accessed datasets, and dark-color blocks represent hash tables. As can be seen from FIG. 9, when two independent hash join processing threads both adopt the processing technology of W-order scan, there are equal number of conflicting pages with sequentially accessed datasets and hash tables in each page-color address region, resulting in the same conflicting probability. That is, in the parallel hash join query processing in the multi-core processor, the W-order scan optimization technology of the same structure can be used for each query.

The access optimization method for the main memory database based on page-coloring provided in the present invention is illustrated in detail above. The method is mainly applied in an application scenario where data in the main memory database resides in the main memory in advance, and especially in OLAP query processing optimization of a main memory with large datasets. The method can be applied not only in hash join algorithms of existing main memory databases but also in data processing technologies capable of clearly differentiating weak locality datasets and strong locality datasets.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. An access optimization method for a main memory database based on page-coloring, the method comprises the following steps:
    ordering an access sequence of all data pages of a weak locality dataset by page-color during cache access of the main memory database;
    grouping the data pages by the page-color thereof; and
    scanning the data pages of the weak locality dataset in a sequence of page-color grouping.

2. The access optimization method for a main memory database based on page-coloring according to claim 1, wherein:
    the sequence of page-color grouping is a W-order sequence following on page-color.

3. The access optimization method for a main memory database based on page-coloring according to claim 2, wherein:
    applying to an operating system for a large memory block with consecutive psychical addresses to store the weak locality dataset during scanning in the W-order sequence;
    the size of the large memory block is a multiple of a quotient of cache size and set associative number.

4. The access optimization method for a main memory database based on page-coloring according to claim 2, wherein:
    when a virtual memory allocated for the weak locality dataset is not consecutive in physical address, first, page-color indexes are created for virtual address space, an entry address and a page-color of each page are recorded in an index of a binary data structure, and then the indexes are ordered by page-color, page entry addresses with the same page-color are gathered in groups, and scan is performed in a sequence of page addresses of the indexes during scan in the W-order sequence.

5. An access optimization method for a main memory database based on a page-coloring, the method comprises the following steps:
    presetting a number of memory pages having the same page-color as a page-color queue, wherein the page-color queue serves as a memory cache before a memory page is loaded into a central processing unit (CPU) cache; and
    all data pages of a weak locality dataset entering the page-color queue in an asynchronous mode, and then being loaded into the CPU cache to complete data processing.

6. The access optimization method for a main memory database based on page-coloring according to claim 5, wherein:
    the page-color queue is in the form of a cyclic queue, and a queue page, once accessed, becomes an exchange page and is covered by a subsequent page to be accessed.

7. The access optimization method for a main memory database based on page-coloring according to claim 5, wherein:
    in the page-color queue, a cache loading operation of an $i^{th}$ block is pipeline parallel with page copy of an $(i-1)^{th}$ block, wherein i is a natural number.

8. The access optimization method for a main memory database based on page-coloring according to claim 5, wherein:
    the data page is copied to the page-color queue in a DMA memcpy mode.

9. The access optimization method for a main memory database based on page-coloring according to claim 8, wherein:
    a length of the page-color queue depends on a latency of loading the data page into the CPU cache and a latency of the DMA memcpy mode.

10. An access optimization method for a main memory database based on page-coloring, the method comprises the following steps:
    ordering an access sequence of all data pages of a weak locality dataset by page-coloring during cache access of the main memory database;
    grouping the data pages by the page-color thereof;
    scanning the data pages of the weak locality dataset in a sequence of page-color grouping;

presetting a number of memory pages having the same page-color as page-color queue, wherein the page-color queue servers as a memory cache before a memory page is loaded into a central processing unit (CPU) cache; and
all data pages of the weak locality dataset entering the page-color queue in an asynchronous mode, and then being loaded into the CPU cache to complete data processing.

11. The access optimization method for a main memory database based on page-coloring according to claim 10, wherein:
the sequence of page-color grouping is a W-order sequence following on page-color.

12. The access optimization method for a main memory database based on page-coloring according to claim 11, wherein:
applying to an operating system for a large memory block with consecutive psychical addresses to store the weak locality dataset during scanning in the W-order sequence; and
the size of the large memory block is a minute of a quotient of cache size and set associative number.

13. The access optimization method for a main memory database based on page-coloring according to claim 11, wherein:
when a virtual memory allocated for the weak locality dataset is not consecutive in physical address, first, page-color indexes are created for virtual address space, an entry address and a page-color of each page are recorded in an index of a binary data structure, and then the indexes are ordered by page-color, page entry addresses with the same page-color are gathered in groups, and scan is performed in a sequence of page addresses of the indexes during scan in the W-order sequence.

14. The access optimization method for a main memory database based on page-coloring according to claim 10, wherein:
the page-color queue is in the form of a cyclic queue, and a queue page, once accessed, becomes an exchange page and is covered by a subsequent page to be accessed.

15. The access optimization method for a main memory database based on page-coloring according to claim 10, wherein:
in the page-color queue, a cache loading operation of an $i^{th}$ block is pipeline parallel with page copy of an $(i-1)^{th}$ block, wherein i is a natural number.

16. The access optimization method for a main memory database based on page-coloring according to claim 10, wherein:
the data page is copied to the page-color queue in a DMA memcpy mode.

17. The access optimization method for a main memory database based on page-coloring according to claim 16, wherein:
a length of the page-color queue depends on a latency of loading the data page into the CPU cache and a latency of the DMA memcpy mode.

* * * * *